UNITED STATES PATENT OFFICE 2,164,780

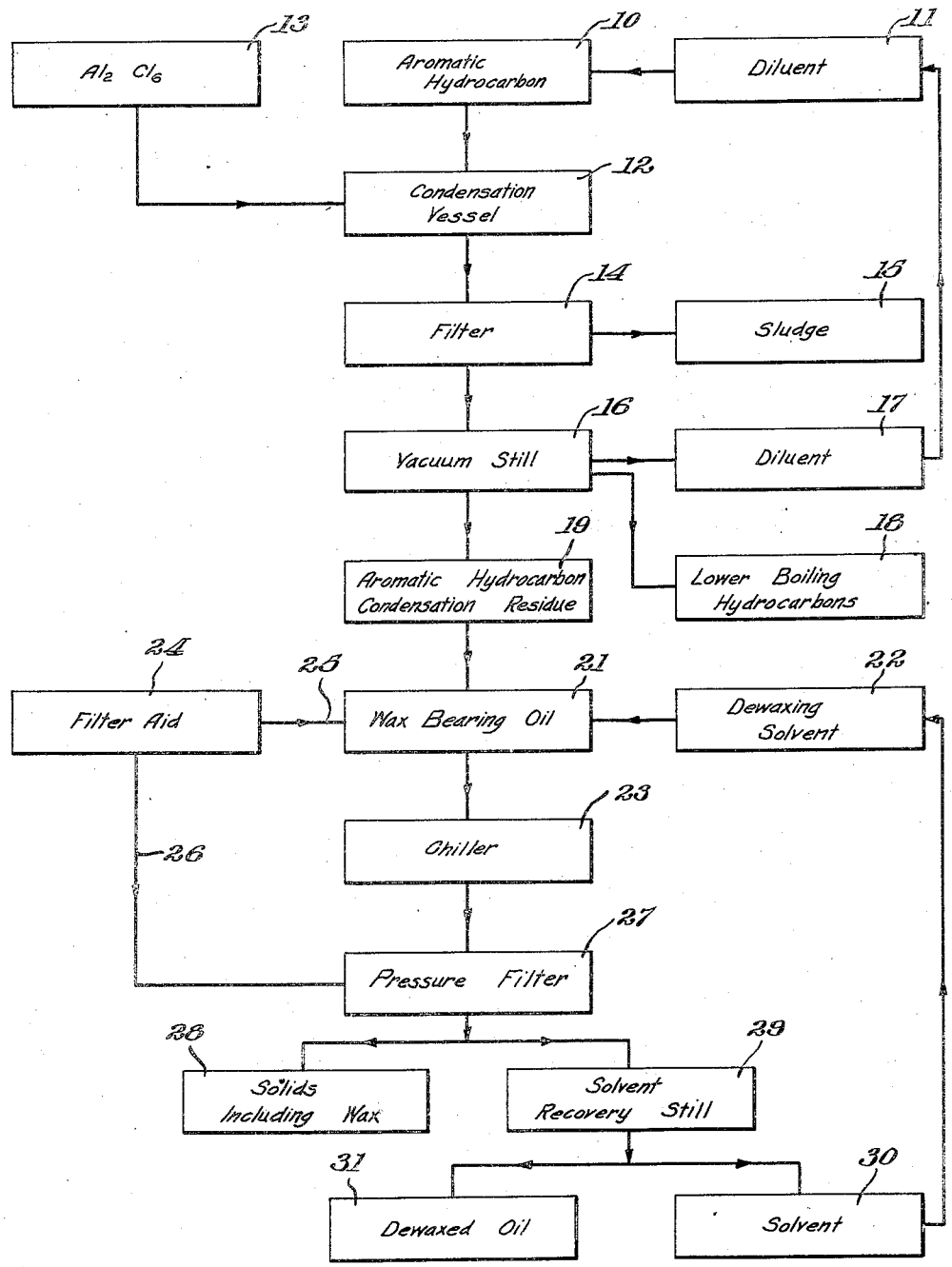

REMOVAL OF WAX FROM HYDROCARBON OIL

Ernest F. Pevere, Beacon, N. Y., assignor to The Texas Company, New York, N. Y., a corporation of Delaware Application March 21, 1934, Serial No. 716,564

1 Claim. (Cl. 196—18)

This invention relates to the dewaxing of wax bearing oil, and particularly to the separation of wax from a mineral lubricating oil.

The invention contemplates the separation of wax from such a wax bearing oil by the employment of a condensation product of an aromatic hydrocarbon as a wax crystal modifying material, to facilitate dewaxing by centrifuging, cold settling or filtration. A condensation product of the character of the pour point depressant material disclosed in my co-pending application, Ser. No. 698,495, filed November 17, 1933, is found particularly suitable for this purpose.

In accordance with the present invention, the wax crystal modifying material is added to a wax bearing oil, and the oil then chilled with resultant precipitation of wax in a form which is found to facilitate separation by centrifuging or cold settling, and which is also found to materially increase filtering rates where the wax is separated by filtration. The wax crystal modifying material is prepared by condensing an aromatic hydrocarbon in the presence of a Friedel-Craft's catalyst, followed by separation of sludge and recovery of a condensed oily material which may be used directly, but which is preferably vacuum distilled to obtain a residue which is highly concentrated in the desired wax crystal modifying material. Various aromatic hydrocarbons which condense in the presence of a metallic halide catalyst, such as aluminum chloride, can be employed. For example, hydrocarbons of the naphthalene, anthracene, phenanthrene and fluorene groups operate very satisfactorily. Likewise, aromatic hydrocarbons such as benzene, toluene, and homologues thereof, which first form condensed nuclei of one or more of the above groups, and then further condense to high boiling hydrocarbon polymers, can be employed. While I prefer to use an aromatic hydrocarbon such as naphthalene, anthracene, phenanthrene or fluorene, because of its ready availability and cheapness, various homologues and alkylated derivatives thereof function satisfactorily in accordance with the present invention.

The condensation product as described above, is preferably employed in conjunction with a dewaxing solvent or solvent mixture. Various solvents can be used for this purpose, such for example as acetone, ethylene dichloride, methyl ethyl ketone, naphtha, various aliphatic alcohols and the like. Very satisfactory results are secured by the use of a mixture of a wax solvent with a non-solvent, such as a mixture of benzol and acetone, for instance in the proportions of 65% benzol to 35% acetone. Another very satisfactory solvent mixture of this character, particularly for use in the dewaxing of residual oils, consists of 28–35% acetone, 47–57% benzol and 15–18% toluol. A comminuted filter aid material of the character of infusorial or diatomaceous earth may also be employed in conjunction with the wax crystal modifying material, and also with the solvent or solvent mixture. The filter aid material may be added prior to chilling, or after chilling, or both.

Referring to the drawing, in which the single figure is a flow sheet of the method of the present invention, 10 indicates a source of supply of an aromatic hydrocarbon of the character described above. By way of example, the preparation of a wax crystal modifying material from naphthalene is specifically described in the following text; but it is to be understood that other aromatic hydrocarbons of the character set forth above can be employed in place of naphthalene.

The naphthalene, preferably dissolved in a diluent, such as kerosene, supplied from tank 11, is mixed in a condensation vessel 12 with anhydrous aluminum chloride from supply 13. The mixture is heated for a substantial length of time in the condensation vessel, which is provided with a suitable agitator and reflux condenser. Water is then added to decompose the aluminum chloride-hydrocarbon complex and to thereby precipitate the catalyst. A solvent, such as benzene, may be added to insure solution of the reaction product. The material is then passed to a filter 14 to separate sludge 15 from the filtrate which is passed to a vacuum still 16.

The filtrate is then distilled, the kerosene passing off and being condensed and collected in tank 17 for return to supply tank 11 for reuse in the process. Any benzene and unreacted naphthalene distill off at temperatures below 200° C. at 10 mm. Hg. A cut distilling between 200°–225° C./10 mm. is obtained, which is a light colored liquid containing substantial quantities of tetra-methyl-naphthalene. A second cut distilling between 225°–300° C./10 mm. contains substantial quantities of beta-beta-dinaphthyl. At approximately 300°–310° C./10 mm., a red oily material having the formula $C_{26}H_{22}$ and corresponding to the hydrocarbon polymer variously termed tetra-methyl-picene, dimethyl crackene or a naphthanthracene derivative, is obtained in the distillate. The tarry residue which remains non-volatile at a temperature of 300°–310° C. at an absolute pressure of 10 mm. is found unusually effective as a wax crystal modifying material.

While it is usually desirable to distil off the lower boiling polymers, which are comparatively ineffective, to obtain a residue of high concentration, it is not necessary to remove all these lower boiling diluents, as long as the reaction is carried out in a manner to obtain a high yield of the desired residue which remains non-volatile at the high temperatures and under the high vacuum specified. For example, by distilling off compounds boiling below substantially 225° C./10 mm., a residuum is obtained which consists essentially of the residue boiling above 310° C./10 mm., and which is highly effective for purposes of the present invention. The lower boiling hydrocarbons are accumulated in a receiver 18, and the desired residue is passed to a storage tank 19 for use in the dewaxing operation.

The residue from the above-mentioned distillation is a black tarry substance substantially completely soluble in benzene and xylene, to which it imparts a green cast. The percentage yield of the residue depends upon the proportion of aluminum chloride used, and the time and temperature of the reaction. To illustrate, a condensation product prepared from 4 parts of naphthalene to 1 part of aluminum chloride, reacted at a temperature of 30° F. for 24 hours, gave a yield of only about 1.5% by weight of the desired tarry residue, on the weight of the naphthalene employed. On the other hand, using the same proportions of ingredients but with a reaction temperature of 95° C. maintained for 4 hours, a yield of 60.6% tarry residue was obtained. Again, using equal parts of naphthalene and aluminum chloride and allowing the reaction to continue over a period of 24 hours at 100° C., gave a yield of 72.8% of tarry residue on the weight of the naphthalene. The residue referred to in the percentages mentioned above, is that which is non-volatile at a temperature of 310° C./10 mm.

In general, it may be stated that increasing the proportion of aluminum chloride up to and somewhat above equal proportions, gives an increased yield of the desired residue; likewise, increasing the time and temperature of the reaction up to about 24 hours and around 100° C. respectively, gives increased yields of the residue. It is preferred to carry out the reaction with the use of approximately equal proportions of the ingredients, and at a temperature above 90° C. for a period of time in excess of 6 hours. Not only is the yield of the residue increased by control of the proportions of the ingredients and the time and temperature of the reaction, as set out above, but also the activity of the resultant residue is enhanced. While the invention has been described particularly with the employment of aluminum chloride as a condensing agent, it is to be understood that other metallic halide catalysts of the Friedel-Craft's type, such for example as halides of zinc, iron, antimony, cadmium, boron, manganese, nickel, tin and the like, can be used.

The tarry residue produced as outlined above may be added directly to a wax bearing oil; or an extract of the residue may be first prepared and this extract added to the oil to be dewaxed. Thus, a small proportion of the mineral oil to be treated, or other lubricating oil, may be used to form a concentrate of the residue; and this concentrate can then be added in predetermined proportions to the wax bearing oil. Again, different solvents may be employed to produce an extract of the tarry residue, which solvents may be those employed as dewaxing solvents. Suitable solvents include benzene, xylene, toluene, various aliphatic monohydric alcohols and the like.

A further concentrated form of the wax crystal modifying material may be prepared from the tarry residue, by dissolving this residue in a solvent such as benzene, and then diluting the solution with a light petroleum distillate, such as a light naphtha, when a brownish precipitate is thrown out of the solution and can be recovered by filtration. This material analyzes to the formula of tetra-naphthyl, $C_{40}H_{26}$. In dry powdery form, it may be added directly to the wax bearing oil; or the tetra-naphthyl may be dissolved in a small proportion of solvent, such as benzene, to form a concentrate which can be added in liquid form in suitable proportions to the mineral oil.

The wax crystal modifying material is added from tank 19 to a wax bearing oil in a suitable mixer or agitator 21. The proportions in which the modifying material can be added to the wax bearing oil vary; but it is found that by increasing the proportion up to a certain amount for a particular oil gives increasingly beneficial effect, while increasing the proportion beyond that amount gives no further benefit, and in fact, may decrease the effectiveness. For example, a proportion of from 1% to 5% by weight of the tarry residue prepared as outlined above, or an equivalent amount of an extract thereof, has been found to provide satisfactory results. A dewaxing solvent from storage tank 22 is preferably added to the wax bearing oil. By way of example, a solvent mixture of 35% acetone and 65% benzol in the proportions of 1 part of oil to 3 parts of acetone-benzol mixture is described. The oil mixture is then passed through chilling coils 23 where it is chilled to a temperature of around 0° to −10° F. A filter aid material from the hopper feed 24 may be supplied by line 25 to the agitator 21, so that the oil is chilled in the presence of the filter aid material. Or, the filter aid material can be supplied by line 26 to the already chilled oil as the latter is fed to a filter 27. Or, a proportion of filter aid can be added both before and after chilling. The filter 27 may be of any suitable conventional construction, such for example, as a pressure filter or a continuous filter. The solids including wax are removed by the filter and passed to a receiving vat 28, while the filtrate of dewaxed oil and solvent passes to a solvent recovery still 29. Here, the solvent is distilled from the dewaxed oil, and passed to a receiving tank 30, from which it may be returned to the storage tank 22 for reuse in the process. The dewaxed oil is accumulated in a receiving tank 31.

Where a solvent mixture of the character of acetone-benzol or acetone-benzol-toluol is employed, the resulting wax free oil is found to have a pour test of around 0° F. when chilled only to about 0° F. or slightly below. The filtering rates of the chilled oil may be improved as much as 100% to 150% above those obtained when a similar chilled mixture omitting the wax crystal modifying material, is employed. Where the wax bearing oil mixture containing the wax crystal modifying material is chilled to about −10° F. and subjected to cold settling, it is found that more rapid settling of the solid constituents occurs, and a clear supernatant liquid layer of oil and solvent may be readily drawn off from the settled solids. When the solvent is then removed by distillation, a substantially wax free oil of low pour test of around 0° F. is obtained. Where the chilled mixture containing the wax crystal modifying material is subjected to centrifuging, improved separation of the wax from the oil results, giving a wax-free oil of the desired low pour test.

Obviously many modifications and variations of the invention, as hereinbefore set forth, may be made without departing from the spirit and scope thereof, and therefore only such limitations should be imposed as are indicated in the appended claim.

I claim:

In the dewaxing of a wax bearing oil, in which the oil is chilled to precipitate the wax, and the wax separated from the oil, the step of conditioning the oil for wax separation which comprises adding to the wax bearing oil prior to chilling a material consisting essentially of tetranaphthyl $C_{40}H_{26}$.

ERNEST F. PEVERE.